(12) United States Patent
Mikuteit et al.

(10) Patent No.: US 11,631,907 B2
(45) Date of Patent: Apr. 18, 2023

(54) SYSTEM AND METHOD FOR CHARGING OF A BATTERY

(71) Applicant: QUALCOMM Incorporated, San Diego, CA (US)

(72) Inventors: Eric Mikuteit, San Diego, CA (US); Juha Oikarinen, San Jose, CA (US); Gene McAllister, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 15/802,292

(22) Filed: Nov. 2, 2017

(65) Prior Publication Data

US 2019/0131811 A1  May 2, 2019

(51) Int. Cl.
*H01M 10/44* (2006.01)
*H02J 7/00* (2006.01)

(52) U.S. Cl.
CPC ............ *H01M 10/44* (2013.01); *H02J 7/00* (2013.01); *H02J 7/0068* (2013.01); *H02J 7/0069* (2020.01); *H02J 7/00711* (2020.01); *H01M 2220/30* (2013.01); *H02J 2207/20* (2020.01)

(58) Field of Classification Search
CPC .......... H02J 7/0068; H02J 7/0069; H02J 7/00; H02J 7/00711; H02J 7/0021; H01M 10/44; H01M 2220/30
USPC .................................................. 320/138, 139
See application file for complete search history.

(56) References Cited

U.S. PATENT DOCUMENTS

| | | | |
|---|---|---|---|
| 6,861,824 B1 * | 3/2005 | Liu ...................... | H02J 7/0068 320/137 |
| 8,766,600 B2 * | 7/2014 | Hussain ............... | H02J 7/0068 320/135 |
| 9,419,455 B2 | 8/2016 | Wang et al. | |
| 2004/0145348 A1 * | 7/2004 | Bucur .................. | H02J 7/0025 320/128 |
| 2004/0192407 A1 * | 9/2004 | Formenti ............. | H02J 7/0013 455/572 |
| 2005/0253560 A1 * | 11/2005 | Popescu-Stanesti ........ H02J 7/0068 320/138 |
| 2011/0163604 A1 * | 7/2011 | Hong .................... | H02J 9/061 307/66 |
| 2012/0299532 A1 * | 11/2012 | Seethaler ............. | G06F 1/263 320/107 |
| 2014/0292243 A1 | 10/2014 | Bouchez et al. | |
| 2015/0035369 A1 * | 2/2015 | He ....................... | H02J 9/061 307/66 |
| 2015/0357840 A1 * | 12/2015 | Okada ................. | H01M 10/441 320/128 |

(Continued)

FOREIGN PATENT DOCUMENTS

CN  203933123 U  11/2014

*Primary Examiner* — Richard Isla
*Assistant Examiner* — Manuel Hernandez
(74) *Attorney, Agent, or Firm* — Holland & Hart LLP-CLX (57) ABSTRACT

Faster charging of a battery, including: opening a first switch disposed between an input node of the battery and an input node of a load to decouple the input node of the battery from the input node of the load; and charging the battery using a first charging source coupled to the input node of the battery while the load is being powered through the input node of the load via a second charging source having a charge rate slower than the first charging source.

20 Claims, 6 Drawing Sheets

(56) References Cited

U.S. PATENT DOCUMENTS

| | | | |
|---|---|---|---|
| 2015/0357851 A1* | 12/2015 | Huang | H02M 3/158 |
| | | | 320/108 |
| 2016/0149430 A1* | 5/2016 | Hempel | H02J 7/0072 |
| | | | 320/139 |
| 2016/0204623 A1* | 7/2016 | Haggerty | H02J 7/007 |
| | | | 320/162 |
| 2016/0218521 A1* | 7/2016 | Huang | H02J 50/10 |
| 2017/0054328 A1 | 2/2017 | Jung et al. | |
| 2017/0179757 A1* | 6/2017 | Kung | H02J 1/10 |
| 2017/0279284 A1* | 9/2017 | Lim | H02J 7/0045 |
| 2018/0083470 A1* | 3/2018 | Aldehayyat | H02J 7/0068 |
| 2018/0090945 A1* | 3/2018 | Langlinais | H02M 3/1582 |
| 2019/0190284 A1* | 6/2019 | Pinto | H02M 1/32 |
| 2020/0144829 A1* | 5/2020 | Lee | H02J 7/007182 |
| 2021/0281085 A1* | 9/2021 | Lee | H02J 7/0024 |
| 2022/0123378 A1* | 4/2022 | Cao | H02J 7/0068 |
| 2022/0140621 A1* | 5/2022 | Kwon | H02J 7/00714 |
| | | | 320/117 |

* cited by examiner

SYSTEM AND METHOD FOR CHARGING OF A BATTERY

BACKGROUND

Field

This disclosure relates generally to battery chargers, and more specifically, to faster charging of a battery.

Background

Faster charging has become an important feature for mobile devices including mobile phones. However, the retention of cycle life for the batteries of the mobile devices has become challenging with the faster charging. It has been shown that pulse charging can extend the cycle life of the batteries, while charging faster.

Figure 1:
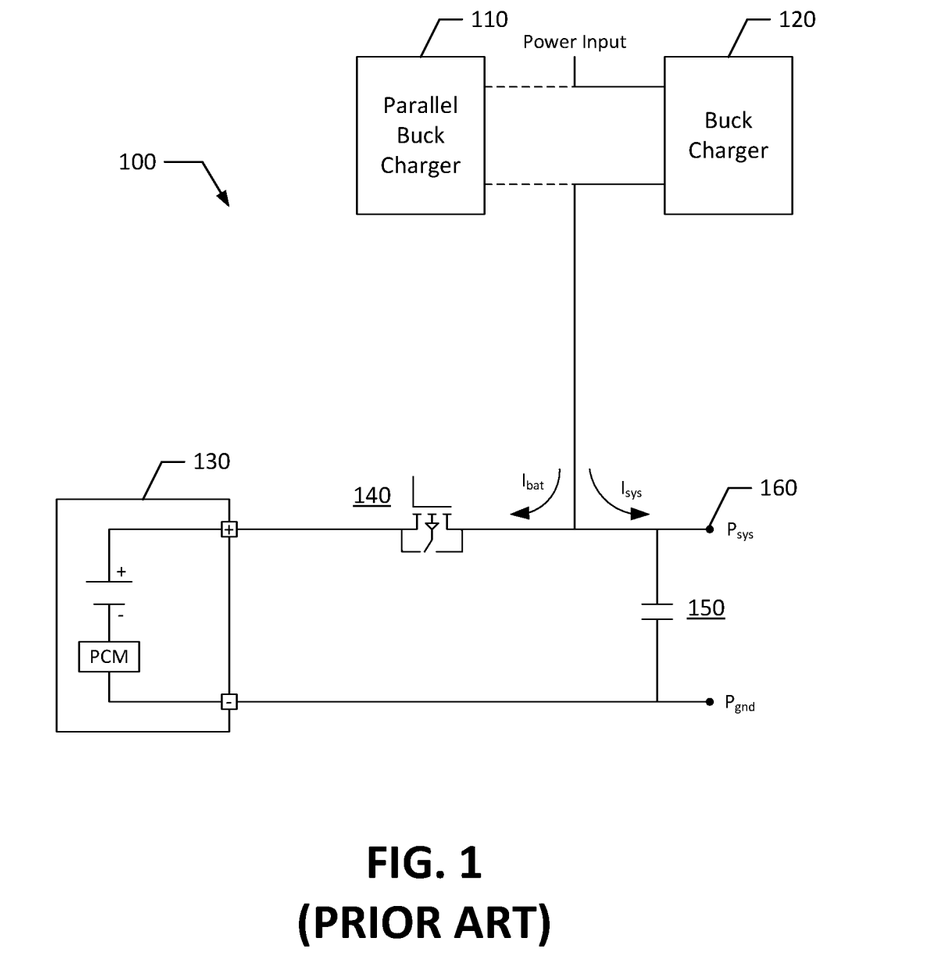
FIG. 1 is a block diagram of one example of an existing battery charging system.

FIG. 1 is a block diagram of one example of an existing battery charging system 100. The existing battery charging system 100 uses a single buck charger 120 or dual parallel buck chargers 110, 120 to charge the battery 130. The existing battery charging system 100 may also include a battery switch 140 configured to decouple the battery 130 from the load when the load is being powered by the buck charger(s) 110, 120 through an input node 160 of the load. A capacitor 150 represents the bulk capacitance of the load.

SUMMARY

The present disclosure describes method, system, and apparatus for faster charging of a battery.

In one implementation, a system for faster charging of a battery is disclosed. The system includes: a first charging source coupled to an input node of the battery, the first charging source configured to charge the battery through the input node of the battery; a second charging source coupled to an input node of a load, the second charging source configured to power the load when the battery is being charged by the first charging source; and a switch having a first node coupled to the input node of the battery and a second node on an opposite side of the switch, the second node coupled to the input node of the load.

In another implementation, a method for faster charging of a battery is disclosed. The method includes: opening a first switch disposed between an input node of the battery and an input node of a load to decouple the input node of the battery from the input node of the load; and charging the battery using a first charging source coupled to the input node of the battery while the load is being powered through the input node of the load via a second charging source having a charge rate slower than the first charging source.

In another implementation, an apparatus for faster charging of a battery is disclosed. The apparatus includes: a first switching means for isolating the battery from the load when the battery is being fast charged, the switching means disposed between an input node of the battery and an input node of the load; and a first charging means for the faster charging of the battery through the input node of the battery, while the load is being powered through the input node of the load.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

As indicated above, the fast pulse charging can extend the cycle life of a battery. However, when the fast pulse charging is used in an existing battery charging system such as the system 100 shown in FIG. 1, the existing battery charging system 100 may place a disruptive noise on the input node 160 of the load.

Thus, to address the disruptive noise issue, in one implementation of the present disclosure, the battery terminals are decoupled from the input node of the load during the faster pulse charging. Accordingly, when the battery terminals are decoupled from the input node of the load, the battery can be charged with a fast pulse charging source, while the load can be powered from a buck charger(s). After reading this description it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 2A:
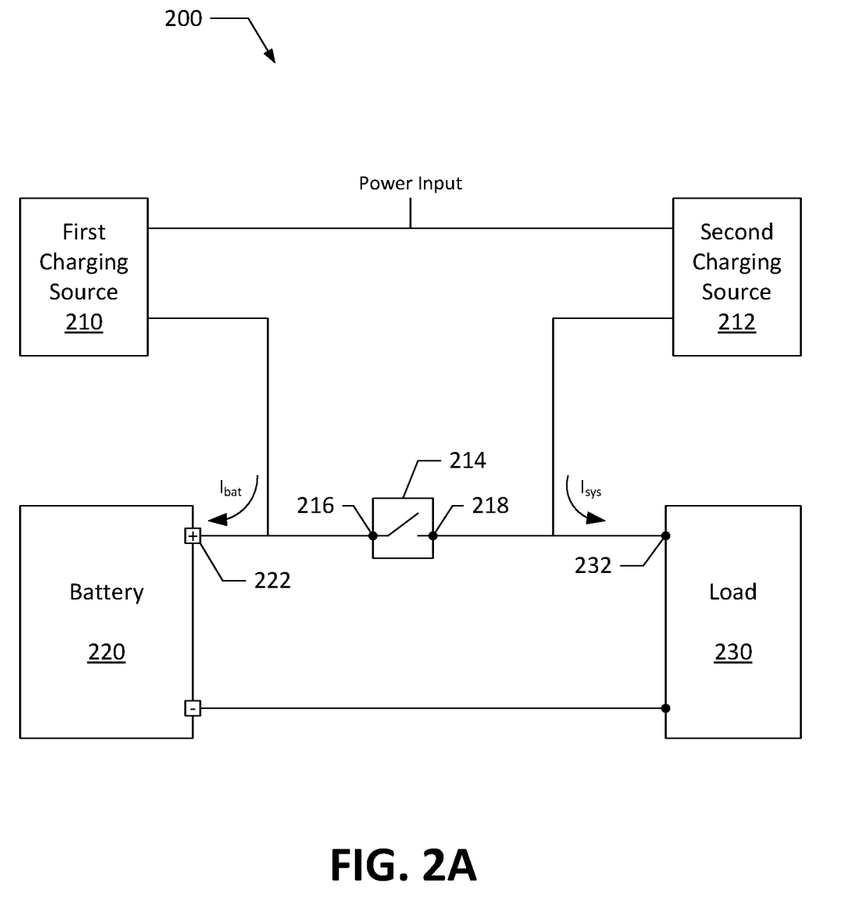
FIG. 2A is a block diagram of a battery charging system in accordance with one implementation of the present disclosure.

FIG. 2A is a block diagram of a battery charging system 200 in accordance with one implementation of the present disclosure. In the illustrated implementation of FIG. 2A, the battery charging system 200 uses a first charging source 210 to charge the battery 220, and a second charging source 212 to power the load 230. The battery 220 is charged through a battery input node 222 and the load is powered through a load input node 232. In one implementation, the first charging source 210 is configured with at least one pulse current charger to allow faster charging of the battery 220. The term "faster charging" refers to charging that is faster than the time (i.e., charging rate) it takes to charge a battery using a standard charger. Thus, in one implementation, the charging rate of the first charging source 210 is faster the standard battery chargers. In another implementation, the charging rate of the first charging source 210 is faster than the charging rate of the second charging source 212. Terms "pulse current" and "parallel charger" refer to the fact that the first charging source is a pulse current charger which is in parallel to the second charging source, which is used to power the load during the faster charging of the battery. In other implementations, charger(s) other than pulse charger(s) can be used for faster charging of the battery 220. For example, buck charger(s) or buck/boost charger(s) can be used for faster charging of the battery 220. In another implementation, the second charging source 212 is configured with at least one buck charger to power the load 230, while the battery is being charged by the pulse charger. In other implementations, the second charging source 212 is configured with charger(s) other than buck charger(s) for powering the load 230. For example, pulse charger(s) or buck/boost charger(s) can be used for powering the load 230. In another implementation, the first charging source 210 is used to charge the battery 220, while the load 230 is not powered during the charging of the battery 220. The load 230 is later powered by the battery 220 or charger(s) when the charging of the battery is done. In this implementation, the second charging source 212 may not be needed.

In the illustrated implementation of FIG. 2A, the battery charging system 200 also includes a switch 214 (having a first node 216 and a second node 218 on the opposite sides of the switch) disposed between the battery input node 222 and the load input node 232. When the battery 220 is being fast charged (i.e., faster charging) by the first charging source 210, the switch 214 is opened to decouple or isolate the battery 220 from the load 230. Thus, during charging of the battery, the first current from the first charge source 210 to charge the battery 220 enters the battery 220 at a point between the battery input node 222 and the first node 216 of the switch 214. Further, the second current from the second charge source 212 to power the load 230 enters the load 230 at a point between the load input node 232 and the second node 218 of the switch 214. Therefore, the switch 214 is configured to decouple or isolate the battery 220 from the load 230, when the battery 220 is being fast charged by the first charging source 210 through the input node 222 of the battery 220. Accordingly, this decoupling or isolation prevents the disruptive noise of the faster charging from entering the load 230 through the load input node 232.

In contrast to the implementation of FIG. 1, the battery charging system 200 of FIG. 2A is configured with the first charging source 210 coupled to the battery 220 on the opposite side of the load 230 with respect to the switch 214. Thus, while the battery 220 is being fast charged by the first charging source 210, the switch 214 is opened to decouple the battery input node 222 from the load input node 232. Therefore, as described above, the opening of the switch 214 isolates the disruptive noise of the faster charging away from the load input node 232 during the faster charging period.

Figure 2B:
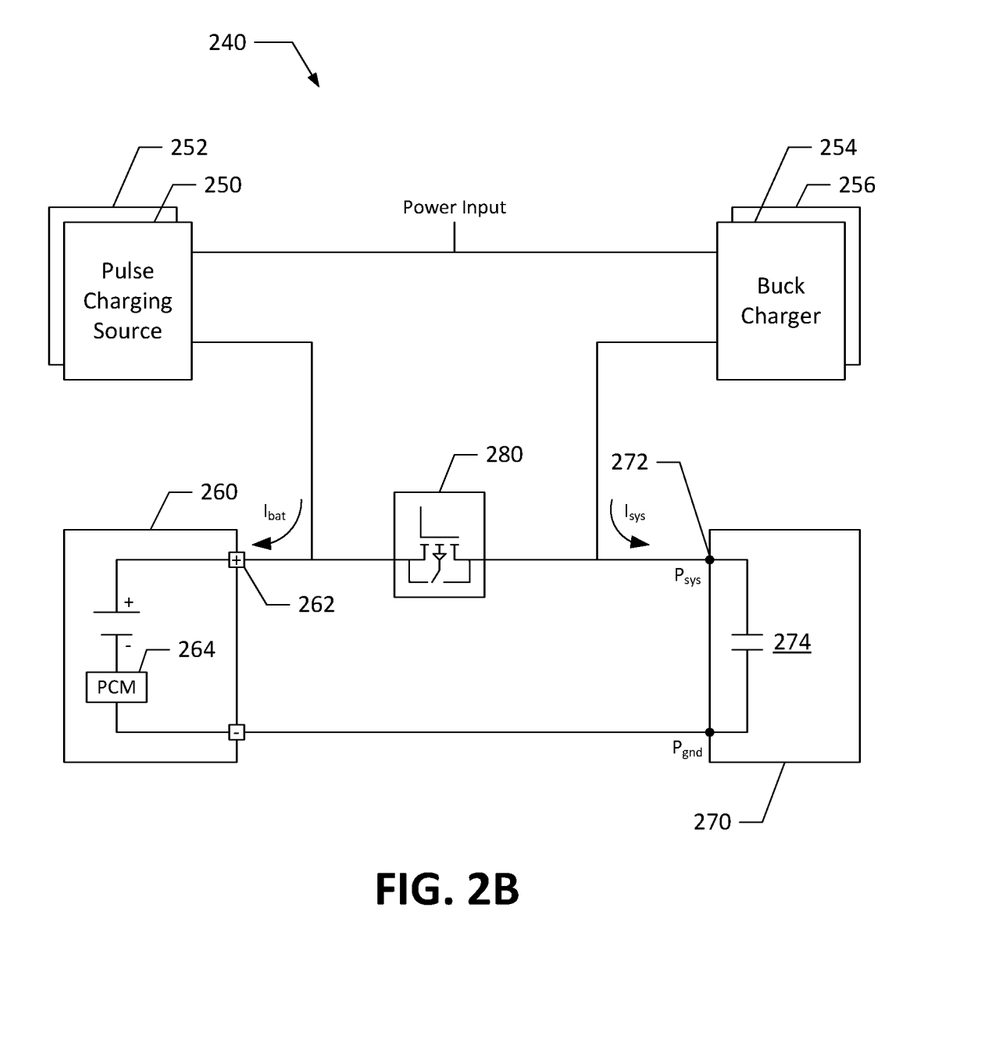
FIG. 2B is a block diagram of a battery charging system in accordance with one particular implementation of the present disclosure.

FIG. 2B is a block diagram of a battery charging system 240 in accordance with one particular implementation of the present disclosure. In the illustrated implementation of FIG. 2B, the battery charging system 240 uses at least one pulse (one or more) charger 250, 252 to charge the battery 260, and at least one (one or more) buck charger 254, 256 to power the load 270. The at least one pulse charger 250, 252 allows faster charging of the battery 260. In one implementation, the battery 260 includes a protection circuit module (PCM) 264 configured to act as a battery management system that manages a rechargeable battery such as by monitoring its state, calculating relevant data needed to monitor the state, and reporting the relevant data. The PCM 264 is also configured to protect the rechargeable battery, control its environment, and balance the battery. The PCM 264 may monitor states including voltage, temperature, state of charge/depth of discharge, state of health, air flow, and/or current.

The battery charging system 240 also includes a battery switch 280 configured to decouple the battery 260 from the load 270, when the battery 260 is being charged by the at least one pulse charging source 250, 252 through the input node 262 of the battery 260, while the load 270 is being powered by the at least one buck charger 254, 256 through the input node 272 of the load 270. In one implementation, the switch 280 is configured as a field effect transistor (FET) such as metal-oxide semiconductor field effect transistor (MOSFET) or junction field effect transistor (JFET). In another implementation, the switch 280 is configured as a back-to-back pair of MOSFET switches. In yet another implementation, the switch 280 is configured as one of a mechanical, electrical, or pneumatic switch. A capacitor 274 represents the bulk capacitance of the load 270.

Again, in contrast to the implementation of FIG. 1, the battery charging system 240 of FIG. 2B is configured with the at least one pulse charging source 250, 252 coupled to the battery 260 on the opposite side of the load 270 with respect to the battery switch 280. Thus, while the battery 260 is being fast charged by the at least one pulse charging source 250, 252, the battery switch 280 is opened to decouple the battery 260 from the load 270 during the faster charging period. Therefore, this isolates the noise of the fast pulse charging from the input node 272 of the load 270 during the faster charging period.

Figure 3:
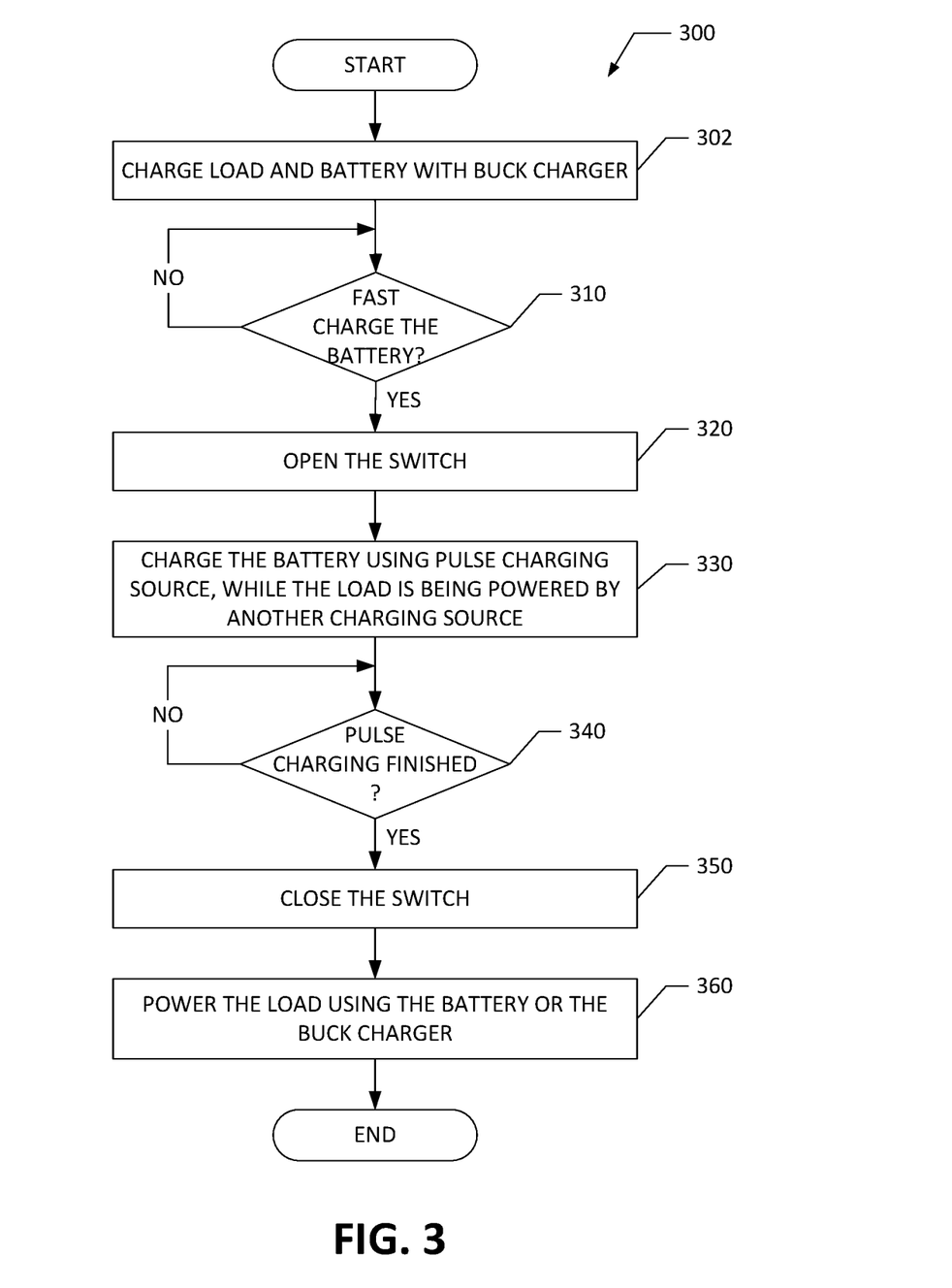
FIG. 3 is a flow diagram of a process for faster charging of a battery in accordance with one implementation of the present disclosure.

FIG. 3 is a flow diagram of a process 300 for faster charging of a battery in accordance with one implementation of the present disclosure. In the illustrated implementation of FIG. 3, the battery and the load are charged with the buck charger, at block 302. Then, a determination is made, at block 310, waiting for a signal or command to begin the faster charging of the battery. Once the command is received, at block 310, a switch disposed between an input node of the battery and an input node of the load is opened, at block 320, to decouple or isolate the input node of the battery from the input node of the load. The opening of the switch occurs before the initiation of the faster charging to ensure that the battery is decoupled from the load during charging. Once the battery switch is opened, the battery is charged, at block 330, using a charging source such as at least one pulse charging source. As described above, during the charging of the battery, the load can be powered by another charging source such as at least one buck charging source.

In the illustrated implementation of FIG. 3, a determination is then made, at block 340, waiting for the faster charging to be finished. Once the faster charging is finished, at block 340, the battery switch is closed, at block 350, to enable the battery to power the load, at block 360. In another implementation, once the faster charging is finished, at block 340, the switch can remain open, while the load is continued to be powered by the charging source such as the buck charging source.

Figure 4A:
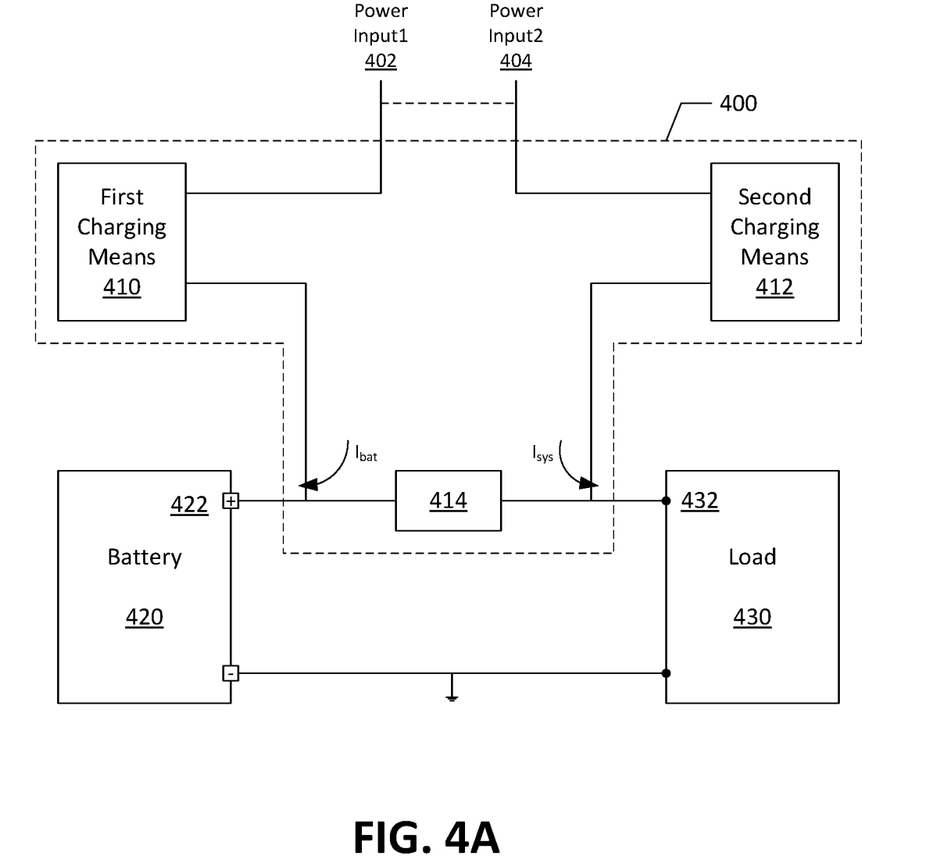
FIG. 4A is a block diagram of an apparatus for faster charging of a battery in accordance with one implementation of the present disclosure.

FIG. 4A is a block diagram of an apparatus 400 for faster charging of a battery in accordance with one implementation of the present disclosure. In the illustrated implementation of FIG. 4A, the battery charging apparatus 400 includes a first charging means 410, a second charging means 412, and a switching means 414. In FIG. 4A, the battery charging apparatus 400 uses a first charging means 410 to charge the battery 420, and a second charging means 412 to power the load 430. The battery 420 is charged through a battery input node 422 and the load is power through a load input node 432. In illustrated implementation of FIG. 4A, the first charging means 410 is powered through power input1 402, while the second charging means 412 is powered through power input2 404. In one implementation, power input1 402 and power input2 404 are connected such that one power source supplies both inputs 402, 404. In another implementation, power input1 402 and power input2 404 are not connected to each other, but are coupled to separate power sources.

In one implementation, the first charging means 410 includes a quick charger that can charge the battery 420 relatively fast without having to sacrifice the cycle life of the battery. In another implementation, the first charging means 410 includes a portable pack that can be carried around by a user and charge the battery multiple times. In the implementation of the first charging means 410 configured as the portable pack, power input1 402 is coupled to the first charging means 410, while power input2 404 is coupled to the second charging means 412.

In one implementation, the first charging means 410 includes a pulse charger, while the second charging means 412 includes a buck converter that can power the load 430 while the battery 420 is being fast charged by the first charging means 410. In another implementation, the second charging means 412 includes a buck-boost converter. In yet another implementation, the second charging means 412 includes a portable pack that can be carried around by a user and power the load while the battery 420 is being fast charged by the first charging means 410.

In the illustrated implementation of FIG. 4A, the battery charging system 400 also includes a switching means 414 disposed between the battery input node 422 and the load input node 432. When the battery 220 is being fast charged by the first charging means 410, the switching means 414 is configured to decouple or isolate the battery 420 from the load 430. Thus, during charging of the battery, the first current from the first charge means 410 to charge the battery 420 enters the battery 420 at a point between the battery input node 422 and the switching means 414. Further, the second current from the second charge means 412 to power the load 430 enters the load 430 at a point between the load input node 432 and the switching means 414. Therefore, the decoupling or isolation prevents the disruptive noise of the faster charging from entering the load 430 through the load input node 432. In one implementation, the switching means 414 is configured as a mechanical, electrical, or pneumatic switch. In another implementation, the switching means 414 is configured as an electronic switch such as a FET switch. In yet another implementation, the switching means 414 is configured as a MOSFET switch. In yet another implementation, the switching means 414 is configured as a DEFT switch. In yet another implementation, the switching means 414 is configured as back-to-back MOSFET switches, which prevent body diode conduction in either direction.

Figure 4B:
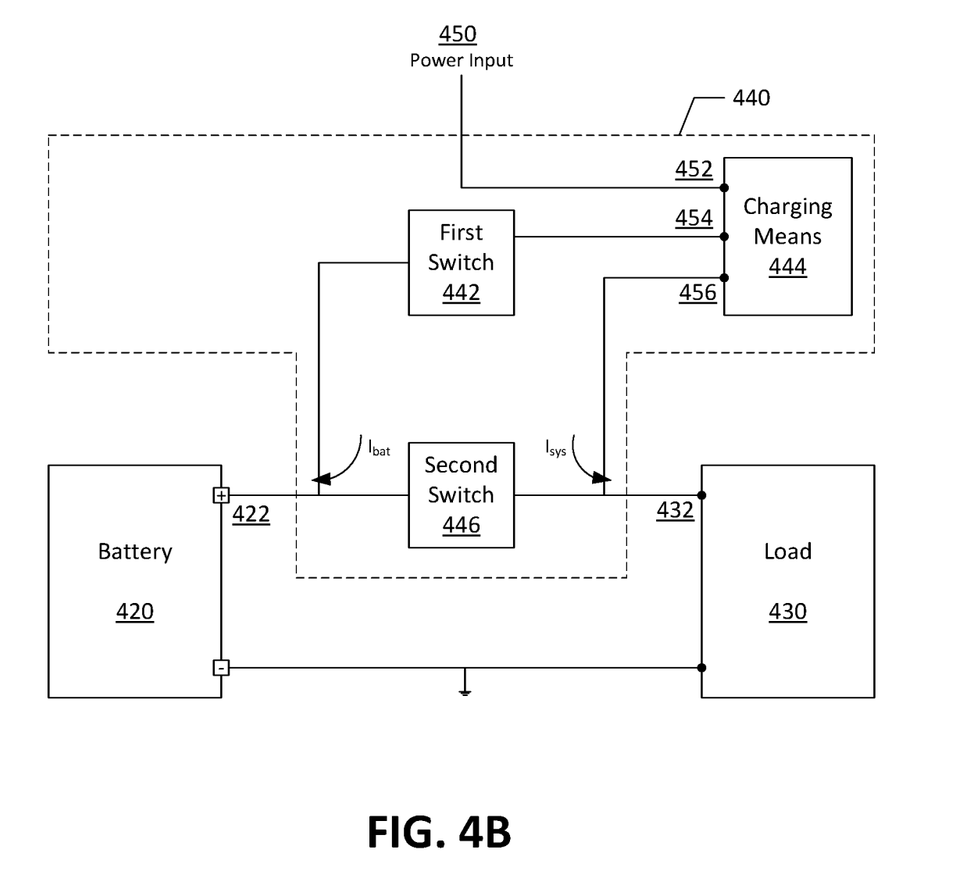
FIG. 4B is a block diagram of an apparatus 440 for faster charging of a battery in accordance with another implementation of the present disclosure.

FIG. 4B is a block diagram of an apparatus 440 for faster charging of a battery in accordance with another implementation of the present disclosure. In the illustrated implementation of FIG. 4B, the battery charging apparatus 440 includes a charging means 444, a first switching means 442, and a second switching means 446. The charging means 444 includes one input 452 from a power source 450 and two outputs 454, 456. Thus, in FIG. 4B, the charging means 444 uses the first output 454 to charge the battery 420 and uses the second output 456 to power the load 430. The first switching means 442 is used to connect the first output 454 to the battery input node 422 when the battery 420 is to be charged by the charging means 444, and to disconnect the first output 454 from the battery input node 422 when the battery 420 does not need charging. Therefore, when the battery 420 is to be charged, the first switching means 442 is closed to connect the charging means 444 to the battery input node 422. Further, similar to the implementation of FIG. 4A, the second switching means 446 is used to isolate the load input node 432 from the battery input node 422 by opening the second switching means 446 and keeping it opened during the faster charging of the battery 420 using the charging means 444. Thus, in one implementation, the charging means 444 is a pulse charger.

In the illustrated implementation of FIG. 4B, the second output 456 of the charging means 444 is directly connected to the load input node 432 so that when the battery 420 is being charged, the second switching means 446 is opened and the charging means 444 powers the load 430 through the load input node 432. In contrast, when the battery 420 has finished charging and the load 430 is to be powered by the battery 420, the second switching means 446 is closed and the input 452 of the charging means 444 is disconnected from the power source 450.

Those of skill in the art will appreciate that the various illustrative blocks and units described in connection with the implementations disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block without departing from the disclosure.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Thus, it is to be understood that the description and drawings presented herein represent presently preferred implementations of the disclosure and are therefore representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

What is claimed is:

1. A system for charging a battery, the system comprising:
    a first charging source coupled to an input node of the battery, the first charging source configured to charge the battery through the input node of the battery;
    a second charging source directly connected to an input node of a load, the second charging source configured to power the load when the battery is being charged by the first charging source, wherein the second charging source has a charge rate slower than the first charging source; and
    a switch having a first node coupled to the input node of the battery and a second node on an opposite side of the switch, the second node coupled to the input node of the load, wherein the switch is configured to switch from the second charging source to the first charging source for charging the battery.

2. The system of claim 1, wherein the first charging source comprises at least one pulse charger and the second charging source comprises at least one buck charger.

3. The system of claim 2, wherein the switch is configured to decouple the at least one pulse charger from the input node of the load while charging the battery.

4. The system of claim 1, wherein the first charging source is portable.

5. The system of claim 1, wherein the first charging source is powered from a first power source and the second charging source is powered from a second power source.

6. The system of claim 1, wherein the switch comprises a back-to-back pair of metal-oxide semiconductor field effect transistor (MOSFET) switches.

7. The system of claim 1, wherein the switch comprises a field effect transistor (FET) switch.

8. The system of claim 1, wherein the switch comprises a MOSFET switch.

9. The system of claim 1, wherein the switch comprises a junction field effect transistor (JFET) switch.

10. The system of claim 1, wherein the switch is configured to isolate the input node of the battery from the input node of the load based at least on a signal received to initiate the charging of the battery by the first charging source, and wherein the isolation occurs before the initiation of the charging of the battery.

11. A method for charging a battery, the method comprising:
    determining whether to initiate a relatively faster charging of the battery;
    opening, based on the determining and before initiation of the relatively faster charging, a first switch disposed between an input node of the battery and an input node of a load to decouple the input node of the battery from the input node of the load; and
    charging the battery using a first charging source coupled to the input node of the battery while the load is being powered through the input node of the load via a second charging source having a charge rate slower than the first charging source.

12. The method of claim 11, further comprising:
    determining whether the relatively faster charging has finished; and
    closing the first switch based on determining that the relatively faster charging has finished.

13. The method of claim 11, wherein the second charging source comprises a buck charger.

14. An apparatus for charging a battery, the apparatus comprising:
    a first switching means for isolating the battery from a load based on a determination to initiate a relatively faster charging of the battery, the first switching means disposed between an input node of the battery and an input node of the load, wherein the isolation of the battery from the load occurs before the initiation of the relatively faster charging; and
    a first charging means for the relatively faster charging than a second charging means, of the battery through the input node of the battery, while the load is being powered by the second charging means through the input node of the load.

15. The apparatus of claim 14, further comprising:
    the second charging means coupled to the input node of the load, wherein the second charging means has a charge rate slower than the first charging means.

16. The apparatus of claim 15, wherein the first charging means and the second charging means are portable.

17. The apparatus of claim 15, wherein the first charging means and the second charging means are coupled to different power sources.

18. The apparatus of claim 14, wherein the load is powered using the first charging means.

19. The apparatus of claim 18, further comprising a second switching means for enabling the relatively faster charging of the battery using the first charging means while the load is also powered using the first charging means.

20. The apparatus of claim 19, wherein the second switching means couples a first output of the first charging means to the input node of the battery, and wherein the first switching means decouples a second output of the first charging means from the input node of the battery, the second output directly coupled to the input node of the load to provide power to the load.

* * * * *